UNITED STATES PATENT OFFICE.

HERMANUS TIBERIUS HABBEMA, OF AMSTERDAM, NETHERLANDS.

PROCESS FOR THE PREPARATION OF ARTIFICIAL MILK PRODUCTS.

1,403,405.  Specification of Letters Patent.  Patented Jan. 10, 1922.

No Drawing.  Application filed May 27, 1919. Serial No. 300,167.

*To all whom it may concern:*

Be it known that I, HERMANUS TIBERIUS HABBEMA, a subject of the Queen of the Netherlands, and residing at Amsterdam, the Netherlands, Distelweg 12, have invented certain new and useful Improvements in Processes for the Preparation of Artificial Milk Products, of which the following is a specification.

The invention relates to the manufacture of artificial cream, artificial butter, artificial cheese, etc., which products possess exactly the same properties and are as nutritive as those prepared with natural milk and only differ from them in this, that a vegetable or animal fat or fatty mixture is substituted for the original fat of the milk.

It has long been known how to extract the butter fat from milk by a centrifugal process or otherwise and to substitute for the same other fats; various methods with this object in view have already been described in patent specifications or patent applications.

In view of the fact that fat is found in the milk in emulsive state, it has been generally concluded that it is of the greatest importance to get to know the factors, which can influence the emulsive state of butter fat. It is well known that albuminous substances act as emulsifying agents; the facility with which the fats are thus emulsified, as well as their concentration, are closely related to the state of solubility of the albuminous substances in solution. An increase in the concentration of the albumens dissolved will therefore result in the emulsion of a larger quantity of fat and a greater stability of the fatty emulsion. Also the fact that a larger quantity of fat can be emulsified or a more stable emulsion is obtained in skimmed milk to which albumens have been added in one form or the other (in the form, for instance, of condensed milk or milk powder) has been the subject of various patents. Further, it was formerly the general opinion that it was only possible to obtain stable emulsions from milk and alien fats, on condition that protein substances, such as albumen and casein be added to the milk and that one could not otherwise succeed in obtaining a stable emulsion of fat or oil in milk without an extra addition of albumen or without condensing the milk.

Later on, it appeared that this opinion was not quite correct and that the stability of the emulsion greatly depends on the apparatus which serves to distribute the fat in the milk.

The albuminous substances are still, of course, of great importance for emulsifying, and the form in which they are used is not immaterial.

As already pointed out, the facility with which the alien fats are emulsified in milk, and the stability of the emulsion will also greatly depend on the albuminous substances contained in the milk. Fats are not easily emulsified, and then only to limited concentration, in sour milk in which the casein is already coagulated or even in milk of which the degree of sourness has already reached a critical amount, without however having become thick. However, by neutralizing completely or almost completely the quantities of acid with soda, caustic soda, caustic potash or lime water, alien fats can be added in almost any quantities to skimmed milk and be emulsified, provided the fat be intimately mixed with the albuminous substances by means of an intense mechanical treatment at a temperature of about 40 to 60 degrees centigrade, as for instance by churning or homogenizing. When adding the soda, potash or lime water, it is not absolutely necessary that an alkaline reaction be obtained, so that the formation of soaps from the fatty esters is not essential to the production of a proper emulsifying action. It is the condition in which the albuminous substances are brought by the alkalies (or the alkali-proteid compounds formed) that produce, to a higher degree, the properties that enable the proteids or proteid compounds to act as emulsifying agents.

The object of the method of the present invention is to bring the albuminous substances, for instance those of milk or skimmed milk, to such a state that, by means of mechanical treatment, fats or fatty mixtures can be added in any proportion to form a stable emulsion. It is then possible, according to the quantity of fat emulsified, not only to obtain a liquid, the composition of which is identical with that of natural full milk or of a liquid of a higher fat concentration than full milk, but the fat is also brought by means of the mechanical treatment to such a state that the liquids thus obtained are identical with natural milk or natural fatty emulsions of a higher percentage of fat, such as cream or coffee cream.

The cream separated from the mixtures can, either in sweet or sour form, be churned to butter, whilst the artificial full milk can be worked into artificial cheese.

The object this method has in view is therefore to obtain emulsions with the aid of albuminous solutions such as milk or skimmed milk and vegetable or animal fats or fatty mixtures, which emulsions shall have all the properties of natural full milk and cream and which products can be worked into a product similar to and absolutely as nutritious and as digestible as natural butter in the same way as for the preparation of the latter, without or after centrifugation, in sweet or sour form; in the latter case, sourness being obtained by means of a pure culture. It is, moreover, possible to start the preparation of this artificial butter with albuminous solutions of pasteurized or sterilized milk, and these solutions can be returned every time for treatment after they have been emulsified with fats and the cream has been subsequently removed. Theoretically speaking, therefore, it is possible to obtain an unlimited quantity of cream and butter with the aid of a small quantity of said albuminous solutions.

This method is of considerable interest for districts where only small quantities of milk are obtainable, for instance in the tropics.

*Example.*

50 or 60 kg. liquid fat or oil are added, at a temperature of about 40 degrees centigrade to 100 liters skimmed milk, brought to the same temperature, and the acidity neutralized by a small quantity of caustic soda or caustic potash, lime water or bicarbonate of soda. It is of importance, as above stated, not to add so great a quantity of alkali as to make the solution substantially alkaline. In this step, the amount of alkali added may preferably be such as to leave a product having an acidity equal to less than 5° Soxhlet-Henkel, and more preferably the acidity should be equivalent to about 3° Soxhlet-Henkel. An excess of alkali would develop soaps, and injure the taste of the product. In the art of making milk products, the Soxhlet-Henkel readings are frequently referred to. In this system, the milk or other liquid is neutralized with one-fourth normal alkali (say NaOH) and the number of cubic centimeters of this alkali required to neutralize the acidity of 100 c. c. of the milk (using phenol phthalein as indicator) is the number of degrees (commonly written as "—°S. H."). This mixture is then homogenized at a pressure of for instance 100 atm. The emulsion obtained, which is very thick, is brought down as rapidly as possible to ordinary room temperature; said emulsion, which contains about 35% of fat, is then worked up to produce butter in the ordinary way as in the case of natural cream. For obtaining artificial cream, it is imperative that the globules of fat be larger, so that the fat-and-milk mixture above referred to is not emulsified with the homogenizing machine, but is thoroughly mixed in a churn. Lastly, pure cultures of lactine or substances such as sugar, vanilla, essences, etc., can be added to the albuminous substances to improve the flavour of the artificial milk products.

The degree of acidity of the milk product is of importance. The product must be feebly acid (not neutral or alkaline), but it must be only slightly acid. Even fresh milk, directly after being drawn from the cow, is usually too acid, and must be partially (but not completely) neutralized.

Since ordinary oils and fats frequently contain considerable percentages of free fatty acid, it is of course, advisable that these be completely removed prior to mixing the oils or fats with the milk or other albuminous liquids, so that the oil or fat be quite neutral so as not to affect the acidity of the milk.

What I claim and desire to receive by Letters Patent is:

1. A process for the preparation of fatty artificial milk products, consisting in the emulsification, in liquids containing albuminous substances, of alien fats, into a stable state, in which the albuminous liquid is brought to a nearly neutral, but not alkaline condition by the addition of small quantities of an alkaline reacting substance, the said fatty emulsion being capable of being converted into butter or cheese in the same way as natural cream.

2. A process for the preparation of fatty artificial milk products, consisting in the emulsification, in a liquid containing albuminous substance, of alien fat, into a stable state, in which the albuminous liquid is brought to a nearly neutral but not alkaline condition by the addition of a small quantity of an alkaline agent, and homogenizing the said emulsion.

3. A process for the preparation of fatty artificial milk products, consisting in the emulsification, in skimmed milk, of alien fat, into a stable state, said skimmed milk being brought to a nearly neutral but not alkaline condition by the addition of small quantities of an alkali thereto.

4. A process of preparing artificial milk products from natural milk products by partially neutralizing the acidity of a lacteal liquid containing proteid matter, to almost complete neutrality, but not to absolute neutrality, and thereafter emulsifying fat in such liquid of very faintly acid reaction.

5. A process of preparing an artificial milk product consisting in emulsifying an alien fat in a liquid containing an albuminous substance in which the said liquid is brought to a nearly neutral, but not alkaline condition by the addition of a small quantity of an alkaline reacting substance, the respective amounts of fat and albuminous liquid being in about the proportions of 50 to 60 kilograms of liquid fat to 100 liters of albuminous liquid.

In testimony whereof I affix my signature.

HERMANUS TIBERIUS HABBEMA.

Witnesses:
D. KLUJN,
M. ALVARADO.